(12) United States Patent
Lafreniere

(10) Patent No.: US 8,434,237 B2
(45) Date of Patent: May 7, 2013

(54) ILLUMINATED LEVEL

(76) Inventor: Denis Lafreniere, Winnipeg (CA)

( * ) Notice: Subject to any disclaimer, the term of this patent is extended or adjusted under 35 U.S.C. 154(b) by 472 days.

(21) Appl. No.: 12/882,338

(22) Filed: Sep. 15, 2010

(65) Prior Publication Data

US 2011/0084848 A1   Apr. 14, 2011

Related U.S. Application Data

(60) Provisional application No. 61/249,694, filed on Oct. 8, 2009.

(51) Int. Cl.
G01C 9/32   (2006.01)

(52) U.S. Cl.
USPC ........................ 33/366.23; 33/348.2

(58) Field of Classification Search ............... 33/366.23, 33/348.2, 370, 371, 379, 381, 382
See application file for complete search history.

(56) References Cited

U.S. PATENT DOCUMENTS

| | | | | |
|---|---|---|---|---|
| 2,171,971 A * | 9/1939 | Cravaritis et al. | ............ | 33/348.2 |
| 2,198,945 A * | 4/1940 | Morris | ............ | 33/348.2 |
| 2,481,736 A * | 9/1949 | Foerster | ............ | 33/348.2 |
| 2,607,882 A * | 8/1952 | Arnold | ............ | 33/348.2 |
| 2,615,122 A * | 10/1952 | Coombs | ............ | 33/348.2 |
| 2,652,481 A * | 9/1953 | Hall | ............ | 33/348.2 |
| 2,922,874 A * | 1/1960 | De Clerk et al. | ............ | 33/348.2 |
| 3,192,375 A * | 6/1965 | Olson | ............ | 33/348.2 |
| 4,407,075 A * | 10/1983 | MacDermott et al. | ....... | 33/348.2 |
| 4,506,450 A * | 3/1985 | Fleming et al. | ............ | 33/366.12 |
| 4,876,798 A * | 10/1989 | Zimmerman | ............ | 33/348.2 |
| 4,912,854 A * | 4/1990 | Weadon | ............ | 33/348.2 |
| 5,020,232 A * | 6/1991 | Whiteford | ............ | 33/348.2 |
| 5,075,978 A * | 12/1991 | Crowe | ............ | 33/348.2 |
| 6,748,665 B1 * | 6/2004 | Samp | ............ | 33/348.2 |
| 7,900,366 B2 * | 3/2011 | Spaulding | ............ | 33/348.2 |
| 2008/0072440 A1 * | 3/2008 | Armitstead | ............ | 33/348 |
| 2009/0235544 A1 * | 9/2009 | Spaulding | ............ | 33/301 |
| 2011/0005091 A1 * | 1/2011 | Pedersen | ............ | 33/348.2 |
| 2011/0084848 A1 * | 4/2011 | Lafreniere | ............ | 340/689 |
| 2011/0265339 A1 * | 11/2011 | Allemand | ............ | 33/366.23 |

* cited by examiner

*Primary Examiner* — Yaritza Guadalupe-McCall
(74) *Attorney, Agent, or Firm* — Adrian D. Battison; Ade & Company Inc.

(57) ABSTRACT

An illuminated level has a housing containing a solid body pivotally mounted in the housing and forming a pendulum which can pivot to a first position in which the surface is accurately level. A light path is provided through the solid body having an exit opening at the pivot point and an entry opening the opposite end. A source of laser light on the housing is arranged to transmit light through an orifice on the housing so that the light through the orifice enters the entry opening to pass along the path when the solid body is in the first position and is prevented from entering the entry opening when the solid body is out of the level position. A light receiver in the housing at the outlet is responsive to the passage of light through the path for providing a sound indicating when the solid body is in the first position.

18 Claims, 3 Drawing Sheets

ILLUMINATED LEVEL

This application claims the benefit under 35 USC 119(e) of the priority of Provisional Application 61/249,694 filed Oct. 8, 2009.

This invention relates to an illuminated level which provides an illuminated indication when level is achieved.

BACKGROUND OF THE INVENTION

Conventional spirit levels which are of simple and inexpensive construction comprise a support body which provides a surface to be placed on an object and a bubble tube provided within the body which is generally elongate and positioned with its longitudinal axis either along the length of the surface or transverse thereto so that a gas bubble within the liquid in the bubble tube can be positioned centrally of the bubble tube when the support surface is horizontal or vertical.

Spirit levels of this type are inexpensive and readily available and widely used. However they have a serious disadvantage in that it is very difficult or impossible to use the spirit level in low levels of illumination when the bubble cannot readily be seen.

Alternative forms of level indicating devices have been proposed to overcome this problem of illumination. Generally these solutions provide complicated electrical sensing of the position of a bubble or other floating object. These solutions have found little acceptance generally in the trade probably because they are expensive and complicated in comparison with the simple bubble tube arrangement which is fully satisfactory except in relation to this problem of illumination.

U.S. Pat. No. 4,484,393 of the present inventor discloses an illuminated spirit level which comprises a bubble tube mounted in a support body with light source shielded to define two light paths directed through the bubble tube to apertures on the outside of the support body. With the bubble positioned centrally, the light is communicated directly from the light source through the bubble tube to the apertures. On movement of the bubble relative to the bubble tube caused by inclination of the spirit level, the bubble intercepts one of the light paths so as to cause refraction directing the light away from the aperture. The different refraction is caused by the difference in shape between the lower surfaces of the bubble and the upper surface of the bubble tube. The curvature of the bubble causes the edge to totally reflect the light path to divert the light.

U.S. Pat. No. 7,350,305 (Molitorisz) discloses a levelling device which again uses the optical interaction between a laser beam and a freely floating air bubble confined in a transparent, liquid-filled vial. When the laser beam is impacted by the air bubble, the curved surface of the air-bubble deflects the beam toward the end of the vial, where a photo-electric device is positioned. The photo-electric device activates a sound emitter such as a buzzer.

These devices use the refraction and reflection generated by a bubble and hence have some problems of accuracy.

SUMMARY OF THE INVENTION

It is one object of the invention to provide an illuminated level which uses a laser but provides a more accurate and specific indication when level is achieved.

According to one aspect of the invention there is provided an illuminated level comprising a housing arranged for placing on or attachment to an object to be levelled;

a solid body pivotally mounted in a chamber in the housing and forming a pendulum which can pivot to a first position in which the surface is accurately level and to second positions on either side of the first position;

a light path through the solid body having an entry opening at one end and an exit opening at a second end;

a source of light on the housing arranged to transmit light through an orifice on the housing;

the solid body being arranged such that the light through the orifice enters the entry opening to pass along the path when the solid body is in the first position and is prevented from entering the entry opening when the solid body is in one of the second positions;

and a light receiver responsive to the passage of light through the path for indicating when the solid body is in the first position and therefore the surface is accurately level.

The level be of the type which is used by carpenters or the like to measure the level of a separate object wherein the housing can include a surface for sitting on the object. Alternatively the level can be of the type which is permanently attached to an object such as a gun, projectile launcher, bow or any other object where the level is required.

The light can be a laser or a simple LED.

Preferably the light receiver is arranged to generate a warning signal when the solid body is in the first position.

Preferably the light receiver, which is preferably a photocell is arranged to generate a warning sound and or a visible warning light when the solid body is in the first position.

Preferably the exit opening of the body is located at a pivot point of the body.

Preferably the housing includes a second orifice at the exit opening of the body and located at a pivot point of the body.

Preferably the pivot point forms a fulcrum.

In some embodiments the chamber in the housing is filled or partly filled with a liquid which causes the pendulum to be pushed into the fulcrum. In other arrangements no liquid is provided and instead the pendulum is suspended mechanically.

Preferably the solid body is shaped with a conical section converging toward the fulcrum.

Preferably the inlet opening in the solid body is arranged at an end opposite the pivot point.

Preferably the body includes a pivot axis formed by a fulcrum.

Preferably the body includes a pivot axis formed by a pivot shaft mounted in bearings on the housing.

Preferably the solid body is shaped with a side walls converging toward the pivot axis.

Preferably the solid body has two end faces each lying in a plane at right angles to the pivot axis.

Preferably the body and the housing have cooperating adjacent orifices through which the light passes and wherein the orifices are formed by a drilled hole through the body and the housing and each is covered by a tape which is perforated to form a punched hole smaller than the drilled hole with the punched holes aligned in the first position.

Preferably the cooperating adjacent orifices are located closely adjacent a pivot axis of the body.

Preferably the chamber in the housing is filled or partly filled with a liquid which causes the body to be pushed into a fulcrum.

Preferably the inlet opening in the solid body is arranged at an end opposite a pivot axis.

Preferably there is provided a second system for detecting level of the surface at a second orientation at right angles to the first orientation including a second solid body pivotally mounted in the housing and forming a pendulum which can pivot to a first position in which the surface is accurately level and to second positions on either side of the first position; a second light path through the second solid body having an entry opening at one end and an exit opening at a second end; the second solid body being arranged such that the light through the orifice enters the entry opening to pass along the path when the solid body is in the first position and is prevented from entering the entry opening when the solid body is in one of the second positions; and a second light receiver responsive to the passage of light through the path for indicating when the solid body is in the first position and therefore the surface is accurately level.

Preferably there is a single light source which provide two beams for passing through the first and second bodies.

Preferably there is a single light source uses mirrors for directing the two beams for passing through the first and second bodies.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
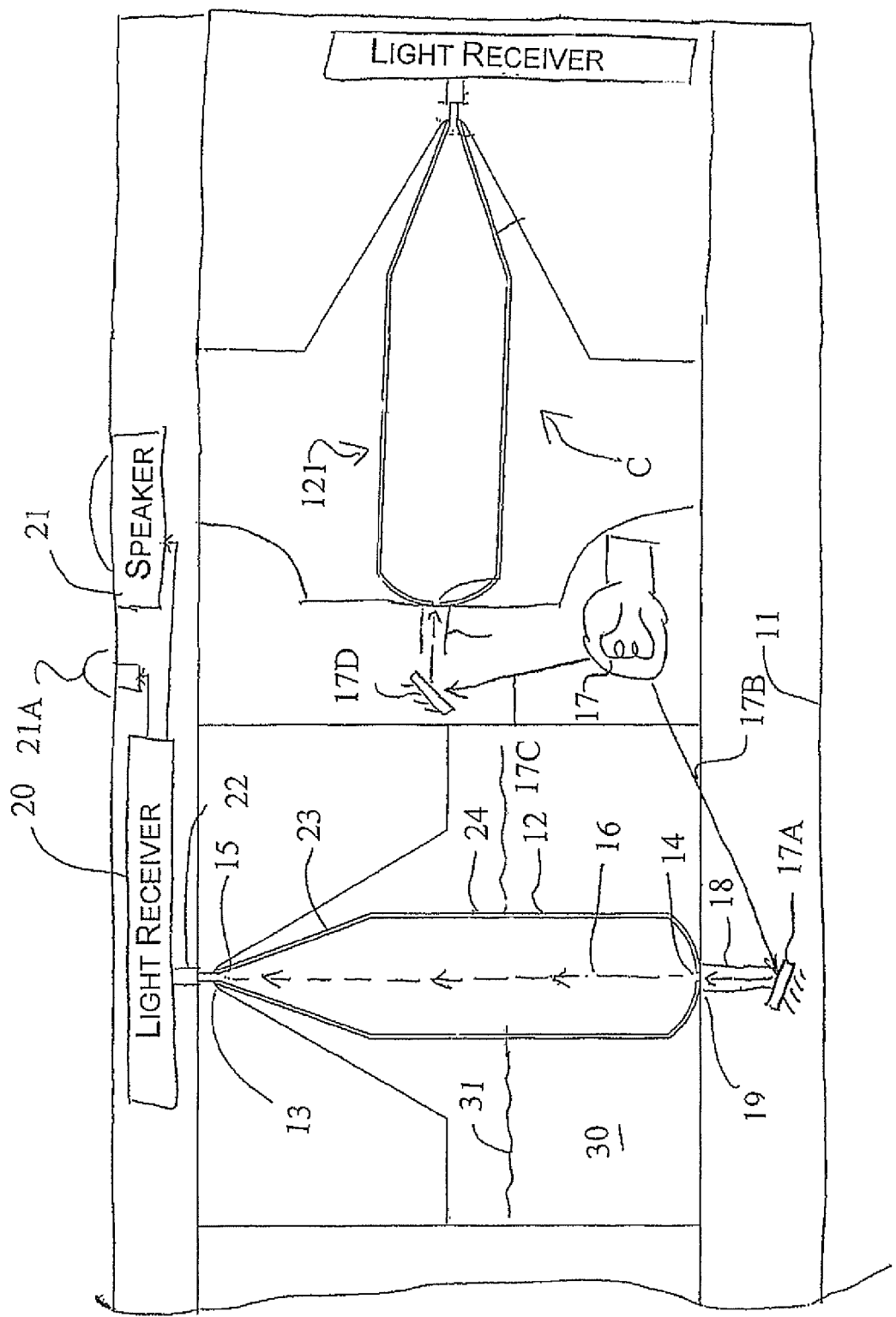
FIG. 1 is a side elevational view of a level according to the present invention.
Figure 2:
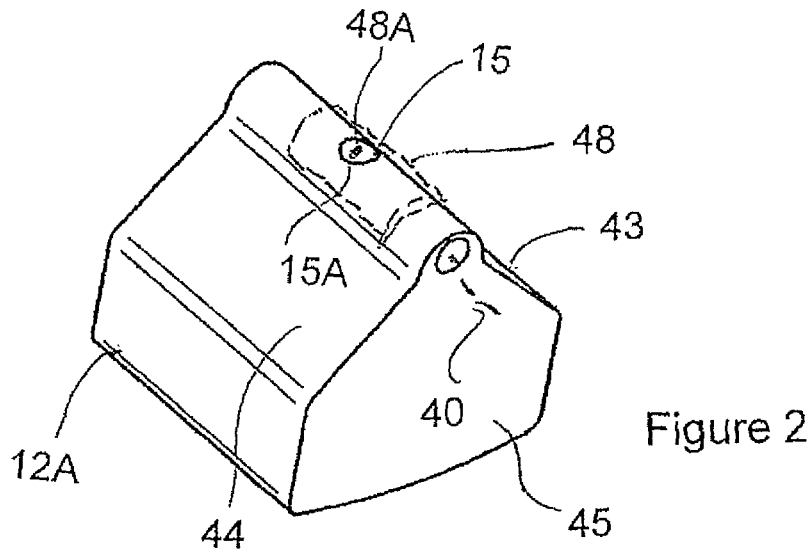
FIG. 2 is an isometric view of a pendulum of an apparatus according to the present invention.
Figure 3:
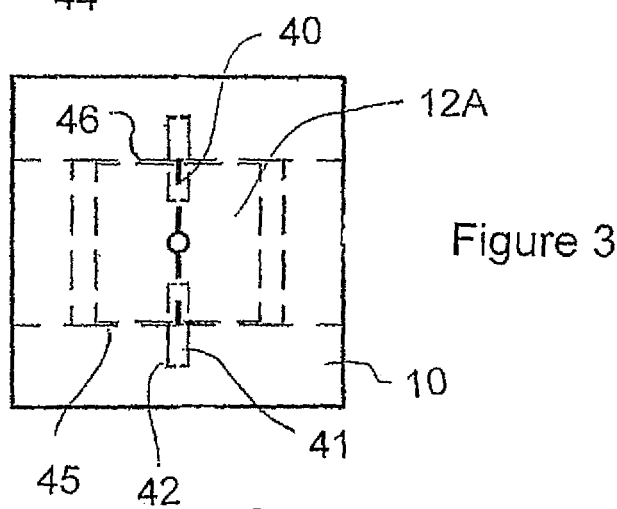
FIG. 3 is top plan view of the apparatus including the pendulum of FIG. 2.
Figure 4:
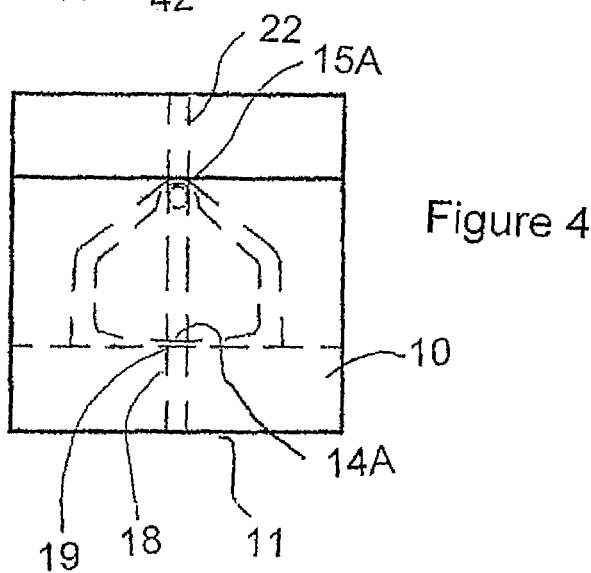
FIG. 4 is side elevational view of the apparatus including the pendulum of FIG. 2.
Figure 5:
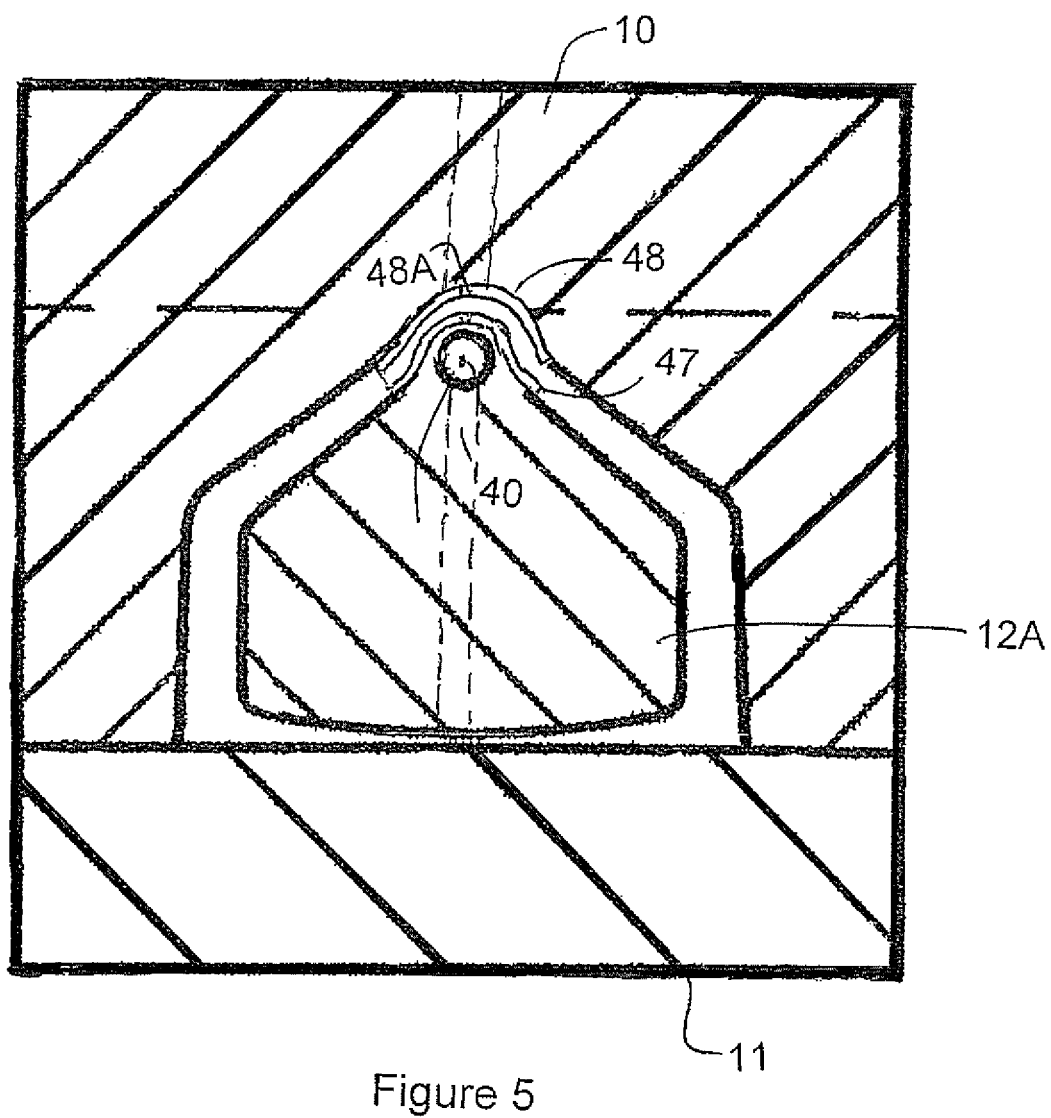
FIG. 5 is cross-sectional view of the apparatus including the pendulum of FIG. 2.

The illuminated level of FIG. 1 includes an elongate housing 10 providing a surface 11 for placing on an object the level of which is to be measured. In the arrangement shown the surface to be measured is horizontal, but arrangements at vertical orientation can be provided y changing the geometry.

A solid body 12 is pivotally mounted in the housing and forming a pendulum pivoted at a pivot point 13 providing a fulcrum. The body is solid in the sense that it is not a bubble in liquid but is instead a solid structure which may be hollow. The body 12 can pivot to a first position as shown in which the body acts as a pendulum hanging vertically downwardly when the surface is accurately level. The body can pivot to second positions on either side of the first position.

A light path 16 is formed through the solid body having an entry opening 14 at one end and an exit opening 15 at a second end at the fulcrum 13.

A source 17 of light on the housing is arranged to transmit light through a path 18 to an orifice 19 on the housing. This can be directly from the sources or can be as shown directed by a mirror 17A. This can be an LED or laser.

The solid body is arranged such that the light through the orifice enters the entry opening 14 to pass along the path 16 when the solid body is in the first position and is prevented from entering the entry opening when the solid body is moved out of the level position.

A light receiver or photocell 20 mounted on the housing is responsive to the passage of light through the path and exiting the outlet 15 into a path 22 for indicating when the solid body is in the first position that the surface is accurately level.

The light receiver is arranged to generate a warning signal by a speaker or sound generator 21 and/or a warning LED 21A when the solid body is in the first position and therefore the light is passing through the path and is detected by the light receiver which may include a light responsive transistor.

The solid body is shaped with a conical section 23 converging toward the fulcrum and has a wider section 24 remote from the fulcrum. The length of the solid body is preferably of the order of 1 inch so as to keep the dimensions of the structure to a suitable size similar to that of conventional arrangements.

In this embodiment, the chamber in the housing is filled or partly filled with a liquid 30 which causes the pendulum to be pushed by its flotation into the fulcrum. The top of the liquid is indicated at 31

As shown at 121 there is provided a second system for detecting level of the surface 11 in the vertical orientation. This includes the same components indicated at C as described above arranged in a symmetrical orientation to generate the same outputs as described above. This arrangement can use a single light source 17 which provide two beams 17B, 17C for passing through the first and second bodies and which uses mirrors 17A and 17D to direct the light.

In FIGS. 2 to 5 is shown an alternative arrangement which includes a body 12A with openings 14A and 15A mounted in a housing 10 with a surface 11. The body 12A includes a pivot axis 40 formed by a pivot shaft 41 mounted in bearings 42 on the housing. The solid body 12A is shaped with side walls 43 and 44 converging toward the pivot axis 41. The solid body has two end faces 45 and 46 each lying in a plane at right angles to the pivot axis 40.

The body and the housing have cooperating adjacent orifices 15A and 22 located closely adjacent a pivot axis of the body through which the light passes and wherein the orifices 15A and 22 are formed by a drilled hole through the body and the housing and each is covered by a portion of tape 47, 48 which applied onto the adjacent surface of the body and the housing is perforated to form a punched hole 48A smaller than the drilled hole with the punched holes aligned in the first position. A light inlet opening 14A in the solid body is arranged at an end opposite a pivot axis 40 to receive light from the light path 18 from the source (not shown in these figures).

In this embodiment, the solid body forming the pendulum is mounted in the housing on pins or a shaft at a generally cylindrical top portion of the pendulum with the sides 43 and 44 diverging outwardly from that cylindrical portion. Thus in this embodiment, there is no supporting liquid in the housing and the pendulum is thus mechanically supported. The sides 45 and 46 are parallel and lie closely adjacent internal side walls of a receptacle in the housing within which the pendulum is mounted. As previously described, a light sources generates a light beam which passes through the pendulum from bottom to top only when it is in a central aligned position where the pendulum hangs directly downwardly from the pivot axis so that the light path is directly at right angles to the surface 11. When the light is detected at the top of the housing as previously described, the surface 11 is properly horizontal.

The shape of the pendulum assists in maintaining it properly in position with the surfaces 45 and 46 at right angles to the surface 11 to prevent side to side twisting.

The use of the punched tape which can be simply punched using a small pin of very small diameter provides a simple technique for manufacturing a hole which is of sufficiently small diameter to allow light to pass only when the pendulum is close to the first position at a small angle.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. An illuminated level comprising
   a housing arranged for placing on or attachment to an object to be levelled;
   a solid body pivotally mounted in the housing and forming a pendulum which can pivot to a first position in which the object is accurately level and to second positions on either side of the first position;
   a light path through the solid body having an entry opening at one end and an exit opening at a second end;
   a source of light on the housing arranged to transmit light through an orifice on the housing;
   the solid body being arranged such that the light through the orifice enters the entry opening to pass along the path when the solid body is in the first position and is prevented from entering the entry opening when the solid body is in one of the second positions;
   and a light receiver responsive to the passage of light through the path for indicating when the solid body is in the first position and therefore the surface is accurately level.

2. The level of claim 1 wherein the light receiver is arranged to generate a warning signal when the solid body is in the first position.

3. The level of claim 1 wherein the light receiver is arranged to generate an audible warning sound when the solid body is in the first position.

4. The level of claim 1 wherein the light receiver is arranged to generate an audible warning sound and a visible warning light when the solid body is in the first position.

5. The level of claim 1 wherein the light receiver is a photocell.

6. The level of claim 1 wherein the exit opening of the body is located closely adjacent a pivot axis of the body.

7. The level of claim 1 wherein the housing includes a second orifice at the exit opening of the body and located at a pivot axis of the body.

8. The level of claim 1 wherein the body includes a pivot axis formed by a fulcrum.

9. The level of claim 1 wherein the body includes a pivot axis formed by a pivot shaft mounted in bearings on the housing.

10. The level of claim 9 wherein the solid body is shaped with a side walls converging toward the pivot axis.

11. The level of claim 9 wherein the solid body has two end faces each lying in a plane at right angles to the pivot axis.

12. The level of claim 1 wherein the body and the housing have cooperating adjacent orifices through which the light passes and wherein the orifices are formed by a drilled hole through the body and the housing and each is covered by a tape which is perforated to form a punched hole smaller than the drilled hole with the punched holes aligned in the first position.

13. The level of claim 12 wherein the cooperating adjacent orifices are located closely adjacent a pivot axis of the body.

14. The level of claim 1 wherein the chamber in the housing is filled or partly filled with a liquid which causes the body to be pushed into a fulcrum.

15. The level of claim 1 wherein the inlet opening in the solid body is arranged at an end opposite the pivot axis.

16. The level of claim 1 wherein there is provided a second system for detecting level of the surface at a second orientation at right angles to the first orientation including a second solid body pivotally mounted in the housing and forming a pendulum which can pivot to a first position in which the surface is accurately level and to second positions on either side of the first position; a second light path through the second solid body having an entry opening at one end and an exit opening at a second end; the second solid body being arranged such that the light through the orifice enters the entry opening to pass along the path when the solid body is in the first position and is prevented from entering the entry opening when the solid body is in one of the second positions; and a second light receiver responsive to the passage of light through the path for indicating when the solid body is in the first position and therefore the surface is accurately level.

17. The level of claim 16 wherein there is a single light source which provide two beams for passing through the first and second bodies.

18. The level of claim 16 wherein there is a single light source uses mirrors for directing the two beams for passing through the first and second bodies.

* * * * *